United States Patent [19]
Bruck

[11] 3,806,208
[45] Apr. 23, 1974

[54] HYDROSTATIC BEARING SYSTEMS
[75] Inventor: Erhard Bruck, Heuchelheim, Germany
[73] Assignee: Ernst Leitz GmbH, Wetzlar, Germany
[22] Filed: Sept. 29, 1972
[21] Appl. No.: 293,397

[30] Foreign Application Priority Data
Oct. 16, 1971 Germany............... 2151582

[52] U.S. Cl. .................................... 308/9
[51] Int. Cl. ............................... F16c 17/16
[58] Field of Search ............................ 308/9

[56] References Cited
UNITED STATES PATENTS
2,523,310  9/1950  Kirkpatrick................ 308/9
2,864,552  12/1958  Anderson................... 308/9

Primary Examiner—Charles J. Myhre
Assistant Examiner—Frank Susko
Attorney, Agent, or Firm—Krafft & Wells

[57] ABSTRACT

Hydrostatic bearing systems comprising a shaft with a cylindrical pressure plate thereon supported by at least one hydrostatic bearing to make the shaft rotatable along its axis and displaceable along its axis by applying hydrostatic pressure to the cylindrical pressure plate.

8 Claims, 6 Drawing Figures

3,806,208

HYDROSTATIC BEARING SYSTEMS

BACKGROUND OF THE INVENTION

The field of the invention is rotary bearings with fluid support and the invention is particularly related to a hydrostatically supported shaft, for example a spindle for lathes.

In order to manufacture precision and optical components which are rotationally symmetrical with a maximum degree of dimensional accuracy and surface quality, the workpieces must be accurately aligned at the time they are clamped into the stationary machine with respect to the axis of rotation of the machine in operation. This requires a significantly minor amount of bearing play in the shafts carrying the workpieces. Accordingly a play-free bearing is required of the machining tool. Besides, in the case where cylindrical surfaces are turned, it is absolutely necessary to ensure that the displacement of the tool relative to the workpiece extends in parallel to the axis of rotation of the workpiece.

Hydrostatic bearings have proven to be advantageous as practically play-free bearings for rotating shafts as well as for displaceable slides. The bearing surface is an oil layer which is constantly maintained under pressure by oil feed. A turning machine having all the critical parts hydrostatically supported is described in Philips technische Rundschau (Philips Technical Review), Vol. 5, pages 117–134, 1969/70. However, the illustrated solution is commercially complicated, since the groups of parts executing the rotary movements and the longitudinal movements are housed in separate structural units with the corresponding bearings for the rotation and the translation.

SUMMARY OF THE INVENTION

The present invention is based on the problem of improving the previously mentioned prior art device so that a hydrostatically supported shaft is provided which is rotatable and displaceable in the same bearing, but wherein the driving forces for rotation and translation are uncoupled from each other.

According to the present invention, a hydrostatically supported shaft is distinguished in that the shaft carries a cylindrical pressure plate rigidly connected therewith. A closed chamber is provided adapted to this pressure plate and filled with oil, having at least one hydrostatic bearing for the shaft. The shaft is rotatable and displaceable along its axis and the chamber has at least two openings for varying the oil pressure in the partial spaces defined by the pressure plate. In this arrangement, the pressure plate can be additionally supported hydrostatically within the chamber. Ducts which are preferably controlled with respect to the amount of medium flowing therethrough are connected to the openings of the chamber. As the thrust means for the pressure plate, oil expanded from the hydrostatic bearing is provided. Moreover, oil injected from the outside can serve as an additional thrust means.

In order to control the axial position, it is advantageous to construct the shaft in such a manner that at least one of the end faces of the shaft exhibits at least one planar surface, and to provide two opposing nozzles mounted on a common support which are in opposition to the planar surfaces. The nozzles are in communication via respectively one channel with one of the partial spaces of the chamber to conduct discharged oil against the planar surfaces. The planar surfaces can be end faces of a rotationally symmetrical baffle plate concentrically and rigidly attached to one end of the shaft. The common support for the nozzles can be mounted so that it is displaceable in parallel to the longitudinal axis of the shaft.

In another embodiment, the shaft has two bores extending in parallel to its longitudinal axis. These bores are in communication via cross bores, with respectively one of the partial spaces and terminate in opposite directions in parallel to the shaft axis. The end openings, preferably constructed as nozzles, are opposed by planar surfaces of a mechanical guide element having the effect of a baffle plate. In this embodiment, the guide element is suitably mounted to be displaceable in parallel to the axis of the shaft.

It is likewise contemplated to provide a throttle effecting a constant oil pressure in the discharge duct of one of the partial spaces, and to associate the other partial chamber with a bore extended through the shaft in the longitudinal direction. This bore terminates in an end face of the shaft, and this end of the bore is opposed by a baffle plate displaceable in parallel to the axis of rotation of the shaft. The baffle plate is pressed against the shaft end with a predetermined force. The force oriented toward the shaft end and effective on the baffle plate can be dependent on the constant pressure in one of the partial spaces.

BRIEF DESCRIPTION OF THE DRAWINGS

In the drawings, the hydrostatically supported shaft of the present invention is schematically illustrated in various embodiments. In detail, the drawings show the following.

DESCRIPTION OF THE PREFERRED EMBODIMENTS

Figure 1:
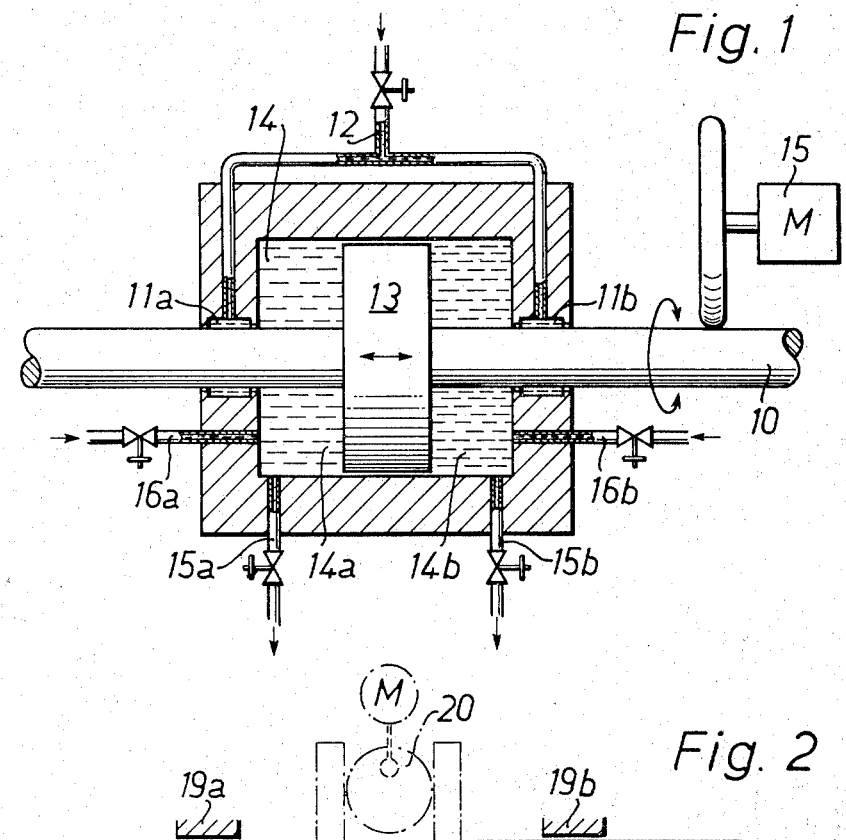
FIG. 1 shows in section the bearing and the shaft associated therewith of a hydrostatic bearing system.

In FIG. 1, a shaft 10 is hydrostatically supported in bearings 11a, 11b. The oil bearing pressure $P_o$ required is produced by means of a conduit system 12. The shaft 10 carries a cylindrical pressure plate 13 rigidly connected therewith and disposed in an oil-filled, closed chamber 14. A motor 15 rotates the shaft 10 with the pressure plate 13 attached thereto in the bearings 11a and 11b. The hydrostatic bearings are preferably constructed so that the largest portion of the bearing oil ejected from these bearings is conducted into the chamber 14, wherein a given oil pressure P which is lower than the bearing pressure $P_o$ is established. As long as the oil pressure in the partial spaces 14a, 14b defined by the pressure plate 13 is equally high, the forces effective on the pressure plate are neutralized and the rotating shaft retains its axial position. By means of ducts 15a and 15b, controllable with respect to the quantity of medium flowing therethrough, a differing oil pressure is caused in the partial spaces 14a, 14b, so that the shaft 10 is axially shifted by the resultant forces effective on the pressure plate 13. Since the oil quantities ejected from the hydrostatic bearings are in certain cases insufficient for a rapid change of the pressure relationships in the partial spaces, additional, controllable oil feed lines 16a and 16b, associated with the partial spaces 14a, 14b, are provided, through which oil can be additionally supplied from the outside.

Figure 2:
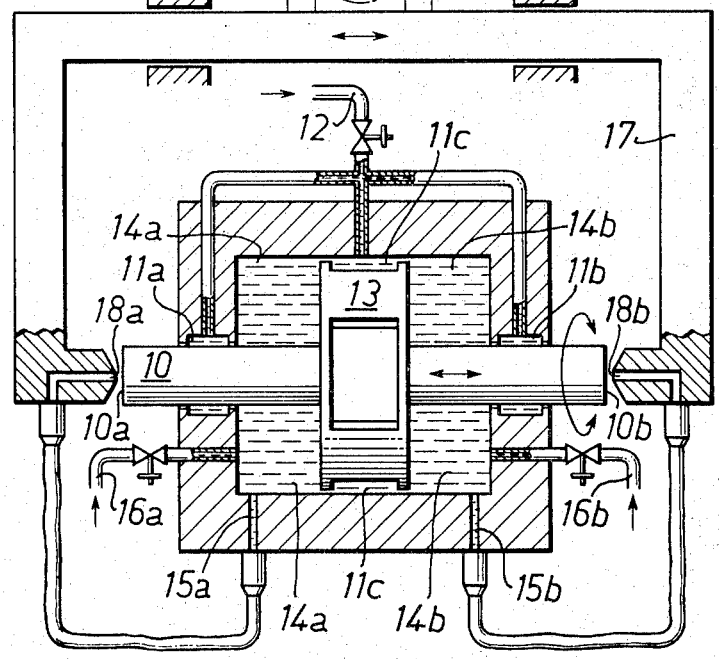
FIG. 2 shows in section an embodiment of FIG. 1 wherein the shaft is axially positioned by nozzles projecting oil on the ends of the shafts.

In FIG. 2, the pressure plate 13 is likewise hydrostatically supported, in addition to the shaft 10, by means of bearing pockets 11c. The discharge ducts 15a, 15b of the partial spaces 14a, 14b are flexibly joined to two nozzles 18a, 18b rigidly, but optionally adjustably mounted on a common carrier 17. The oil ejected from these nozzles is conducted against the end faces 10a, 10b, fashioned as planar surfaces on the ends of the shaft 10. The amount of oil discharged from the respective partial spaces is determined by the size of the gap between the nozzle opening and the end face. Since the mutual spacing of the nozzle openings is fixed by the carrier 17, the rotating shaft 10 is automatically adjusted in its axial position between the nozzles so that the amount of oil discharged is sufficient to produce the same oil pressure in the two partial spaces 14a, 14b. If, as compared to the equilibrium position, one gap is narrowed and, correspondingly, the other is enlarged, the pressure will rise in one partial space, due to the smaller amount of oil discharged therefrom, and the pressure will drop in the other partial space, due to the greater amount of oil flowing out of this space. The resultant thrust forces produced thereby against the pressure plate 13 displace the shaft until the equilibrium position has been regained. Consequently, by displacing the carrier 17 in the guides 19a, 19b in parallel to the axis of the shaft 10, a convenient means is provided for controlling the longitudinal displacement of the shaft from the outside, for example via an eccentric drive 20. The forces to be expended for the control operation are very minor since these forces, at a given pressure in the partial spaces 14a, 14b, are directly proportional to the size of the nozzle opening. An indicating device can be coupled with the support 17, which represents the respective location of the pressure plate 13.

Figure 3:
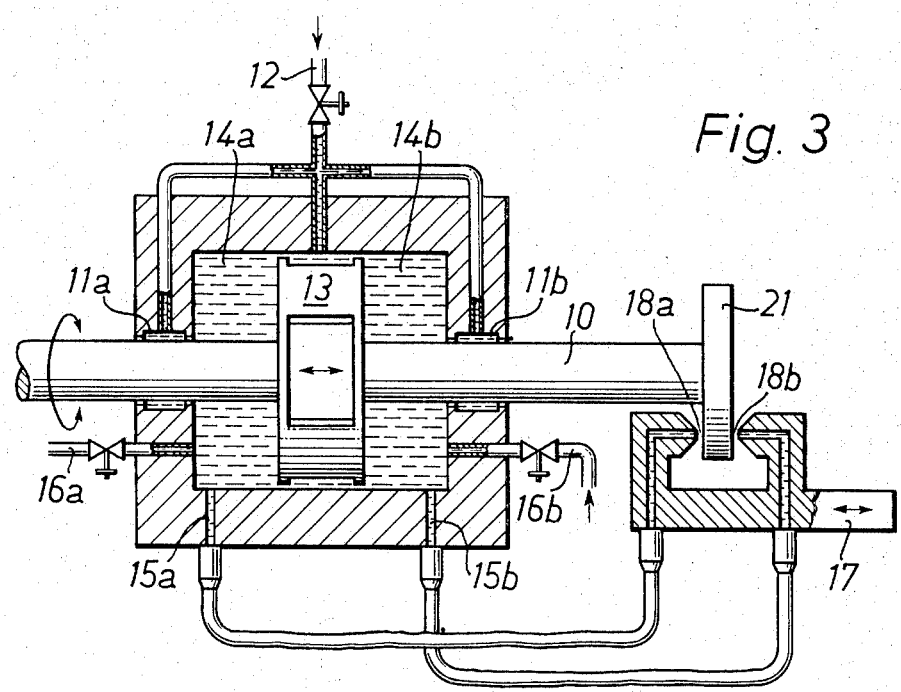
FIG. 3 shows in section an embodiment of FIG. 1 wherein the shaft is axially positioned by nozzles projecting oil onto the sides of a baffle plate connected to the shaft.

FIG. 3 shows a solution for controlling the axial shift of the shaft 10 which is equivalent to the preceding figure. In this case, a rotationally symmetrical baffle plate 21 is rigidly attached concentrically to the shaft 10 on one end face thereof. The discharge ducts of the partial spaces 14a, 14b again terminate in two nozzles 18a, 18b disposed on a common carrier 17. These nozzles conduct the discharged oil against the front and rear of the baffle plate 21. By displacement of the carrier 17, the axial position of the shaft 10 is here again influenced.

Figure 4:
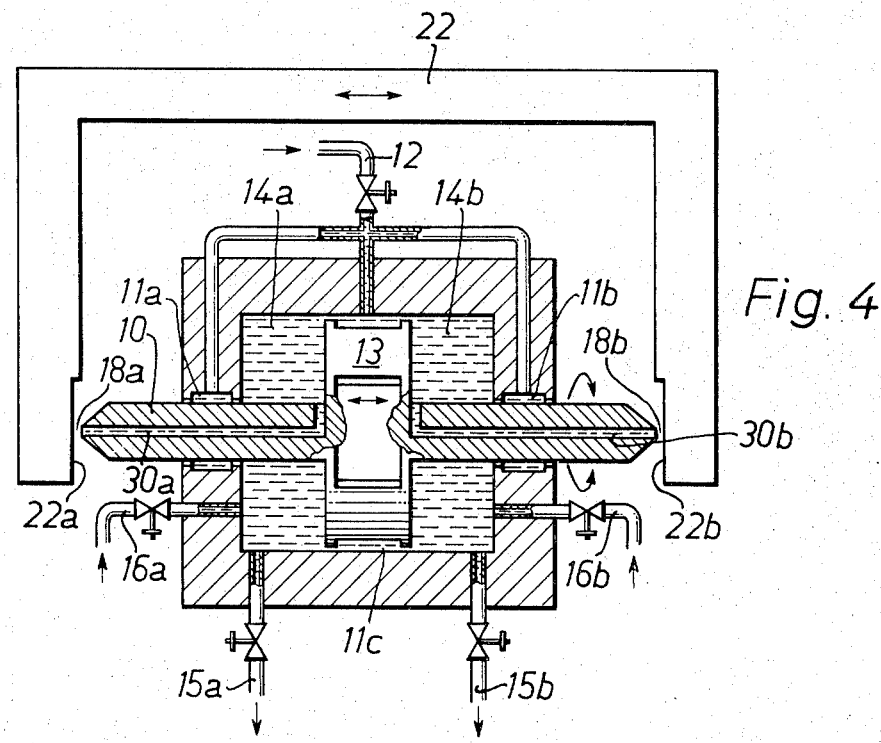
FIG. 4 shows in section an embodiment of FIG. 1 wherein the shaft is axially positioned by nozzles at the ends of a hollow shaft projecting against baffles.

In FIG. 4, the shaft 10 exhibits two bores 30a, 30b in parallel to its longitudinal axis. These bores are in communication, via cross bores, with respectively one of the partial spaces 14a, 14b and terminate in the form of nozzle-shaped openings 18a, 18b in the end face of the shaft 10 respectively adjacent each partial space. Planar surfaces 22a, 22b which are effectively baffle plates are disposed opposite the nozzle-shafted openings. These surfaces are part of a mechanical guide element 22. The discharge ducts 15a, 15b are set to a constant oil efflux, so that the sizes of the gaps between the nozzle-like openings 18a, 18b and the planar surfaces 22a, 22b determine the pressure which is built up in the partial spaces 14a, 14b. Upon displacement of the mechanical guide element 22, first one gap is narrowed and the other enlarged. The unequal pressure relationships produced thereby in the partial spaces 14a, 14b have the effect that the shaft follows automatically the displacement of the guide element until the same pressure has again been attained in both partial spaces.

Figure 5:
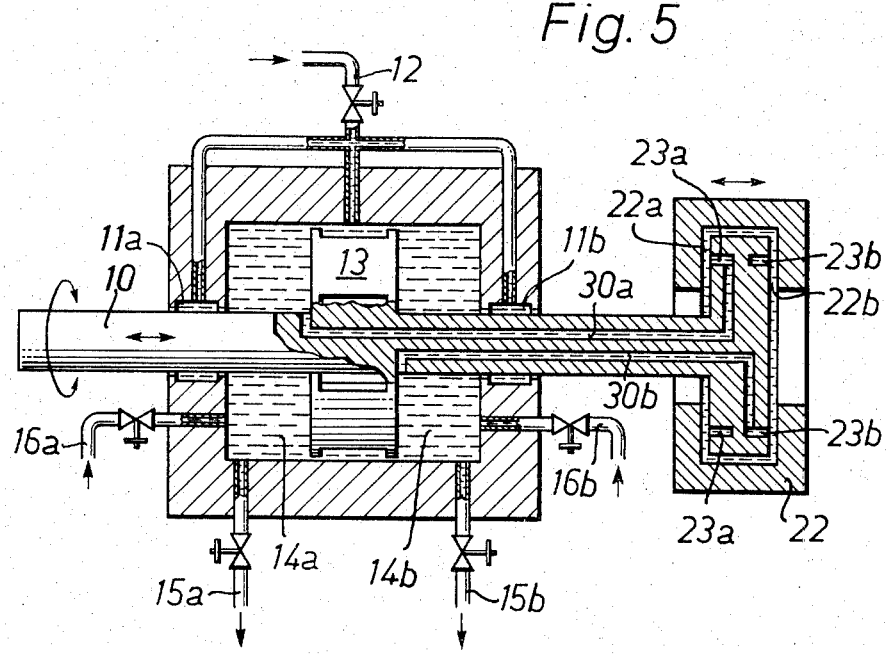
FIG. 5 shows in section an embodiment of FIG. 1 wherein the shaft is axially positioned by oil flowing through a conduit in the shaft to be projected from a rotating baffle against planar surfaces.

In FIG. 5, the two bores 30a and 30b extending in parallel to the longitudinal axis of the shaft, are in communication with the partial spaces 14a, 14b via cross bores and terminate on the same side of the shaft with their openings. They end in two oppositely oriented, annular nozzles 23a, 23b and conduct the exiting oil against the two planar surfaces 22a, 22b of the mechanical guide element 22.

Figure 6:
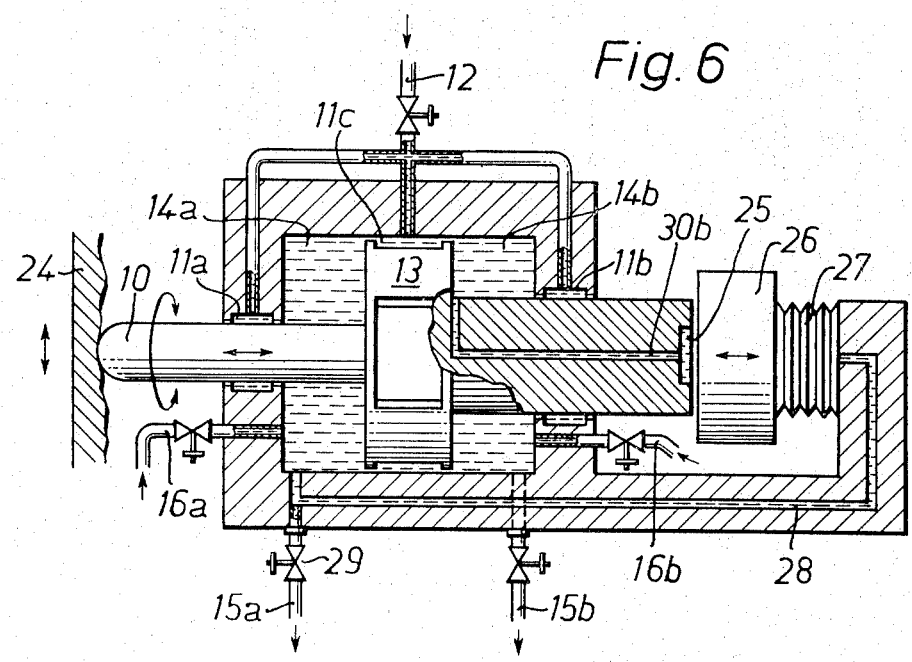
FIG. 6 illustrates in section an embodiment of FIG. 1 having a control device for producing a constant contact pressure of the shaft with respect to a workpiece.

FIG. 6 shows a hydrostatically supported shaft which, independently of its axial position, scans a workpiece with a constant contact force while the shaft is rotating. The shaft 10 has different diameters on both sides of the pressure plate 13, so that different large areas result for the pressure plate 13 in the two partial spaces 14a, 14b. The oil pressure in the partial spaces 14a, 14b is adjusted with the aid of the oil ejected out of the hydrostatic bearings 11a, 11b, 11c and via the feed lines 16a, 16b and the discharge lines 15a, 15b so that a resultant thrust force is effective on the pressure plate 13 in the direction toward the workpiece 24 being scanned. The pressure in the partial space 14a is preferably maintained constant by means of a throttle 29. The resultant contact pressure is then controlled by way of the pressure in the partial space 14b. Upon an axial displacement of the shaft 10 due to the unevennesses of the workpiece 24 to be scanned, the adjusted pressure relationships are, however, altered unless additional measures are taken. Therefore, a bore 30b extending through the shaft in the longitudinal direction is associated with the partial space 14b. This bore terminates in a larger surface opening 25 in the end face of the shaft end adjacent the partial space 14b. A baffle plate 26 displaceable in parallel to the axis of rotation of the shaft 10 is disposed opposite to this opening. From the opposite side, via a bellows 27 and a conduit 28, the baffle plate is placed under the constant pressure ambient in the partial space 14a. The oil stream exiting from the opening 25 and under the pressure ambient in the partial space 14b counteracts this pressure. The area ratio of the areas 25 and 27 is equal to that of the areas of the pressure plate in the partial spaces 14a, 14b, so that the forces effective on the baffle plate 26 are reduced, as compared to the forces effective on the pressure plate 13, by the reduction factor of the areas 25 and 27.

If, for a certain axial position of the shaft 10 and of the workpiece 24, the contact pressure against the workpiece 24 is fixedly determined, the gap between the opening 25 and the baffle plate 26 adjusts itself so that the amount of oil discharged thereby is sufficient for maintaining the pressure in the partial space 14b required for the resultant contact pressure. When the workpiece 24, due to its unevenness, shifts the shaft in the axial direction, then, for example, the gap between the opening 25 and the baffle plate 26 is narrowed so that less oil can flow off from the partial space 14b. Thereby, the pressure rises in the partial space 14b. On the other hand, the pressure in partial space 14a is lowered in the same manner. The increasing pressure of the oil stream from the opening 25 thus displaces the baffle plate 26 until the original pressure relationships have been regained. The force ratio reduction attained by the size of the areas 25 and 27 accordingly provides a very sensitive following control for the constant contact pressure of the shaft 10 against the workpiece 24. An indicating device for the axial position of the shaft 10 can be coupled to the baffle plate 26.

Of course, in place of the constant pressure from the partial space 14a, it is also possible to direct another, outside pressure against the baffle plate 26 which deviates from the pressure in partial space 14a. In this case, the same force ratio reduction must be adjusted at the baffle plate 26 by an area ratio which is chosen correspondingly.

In summation, the following advantages are achieved in the novel device: The present arrangement makes it possible to effect, in the same bearing, rotation as well as translation of the supported shaft, wherein the rotation and the translation are controlled independently of each other. In particular, the translation is regulated with the aid of a non-rotating part. The above-described embodiments furthermore show how, by a suitable construction of the shaft, the control forces for the translation are kept smaller by an order to magnitude than the displacement forces of the shaft.

I claim:

1. Hydrostatic bearing systems comprising a shaft (10) with an axis of rotation having a cylindrical pressure plate (13) rigidly connected therewith, a closed, oil-filled chamber (14) surrounding said pressure plate having at least one hydrostatic bearing (11a, 11b) for said shaft (10), said chamber and said pressure plate defining first and second partial spaces (14a, 14b), pressure inlet and outlet means in said chamber located at said partial spaces and control means displaceable parallel to said axis of rotation of said shaft (10) comprising at least one nozzle-baffle plate system with said nozzle connected to said pressure outlet means to displace said pressure plate along said axis.

2. The hydrostatic bearing systems according to claim 1, wherein at least one of the end faces of the shaft 10 exhibits at least one planar surface (10a, 10b), and that two opposed nozzles (18a, 18b) mounted on a common support (17) are provided which are disposed opposite to the planar surfaces (10a, 10b) and, being in connection via respectively one channel with one of the partial spaces (14a, 14b) of the chamber (14), conduct discharged oil against the planar surfaces (10a, 10b).

3. The hydrostatic bearing systems according to claim 2, wherein the planar surfaces are end faces of a rotationally symmetrical baffle plate (21) which is concentrically mounted at one end of the shaft (10) in a rigid manner.

4. The hydrostatic bearing systems according to claim 2, wherein the common support (17) for the nozzles (18a, 18b) has means for displacement parallel to the longitudinal axis of the shaft (10).

5. The hydrostatic bearing systems according to claim 1, wherein the shaft has two bores (30a, 30b) extending in parallel to its longitudinal axis and the bores are in communication, via cross bores, with respectively one of the partial spaces (14a, 14b) and terminate in opposite directions in parallel to the shaft axis; and that these terminal openings are nozzles (18a, 18b; 23a, 23b), which are opposed by planar surfaces (22a, 22b) of a mechanical guide element (22), which surfaces have the effect of a baffle plate.

6. The hydrostatic bearing systems according to claim 5, wherein the guide element (22) has means for displacement in parallel to the axis of the shaft (10).

7. The hydrostatic bearing systems according to claim 1, wherein a throttle (29) effecting a constant oil pressure is provided in the pressure outlet means of one partial space (14a); the other partial space (14b) is associated with a bore (30b) extended through the shaft in the longitudinal direction, said bore terminating in an end face of the shaft (10); and that this end of the bore is opposed by a baffle plate (26) displaceable in parallel to the axis of rotation of the shaft, said baffle plate pressed against the shaft end with a given force.

8. The hydrostatic bearing systems according to claim 7, wherein the force directed against the shaft end and effective on the baffle plate (26) depends upon the constant pressure in one of the partial spaces (14a).

* * * * *